June 6, 1933.   W. T. WHITE   1,913,352
VEHICLE WHEEL
Filed Dec. 20, 1927

Inventor
Will T. White.
R.D. Tregner
Attorney

Patented June 6, 1933

1,913,352

UNITED STATES PATENT OFFICE

WILL T. WHITE, OF AKRON, OHIO, ASSIGNOR TO THE GOODYEAR TIRE & RUBBER COMPANY, OF AKRON, OHIO, A CORPORATION OF OHIO

VEHICLE WHEEL

Application filed December 20, 1927. Serial No. 241,339.

My invention relates to vehicle wheels and it has particular relation to a construction for securing a tire rim upon such wheels.

One object of the invention is to provide an improved rim mounting in which the rim is secured upon its supporting structure by means accessible from the outside of the wheel at only one point.

Another object of the invention is to provide a rim mounting in which the rim is maintained in alignment with the wheel.

Heretofore, rim mountings have been employed which included a securing means accessible from the outside of the wheel at a single point, but none of these prior constructions have been accepted as satisfactory. One of the disadvantages of rim mountings of this type resided in the difficulty of providing a construction in which the rim was maintained in a satisfactorily secure position. The excessive cost of construction also has proved to be a disadvantage to the success of rim mountings of this type.

According to this invention, a rim mounting is provided which can be easily and inexpensively manufactured, and in which the rim is secured upon the felloe in a highly satisfactory manner. The invention contemplates, among other things, the provision of non-accessible engaging means between the felloe and rim, spaced about a circumferential portion of the wheel, and accessible engaging or locking means cooperating with the remaining circumferential portion of the wheel.

For a better understanding of the invention, reference may now be had to the accompanying drawing, forming a part of this specification, in which.

Figure 1:
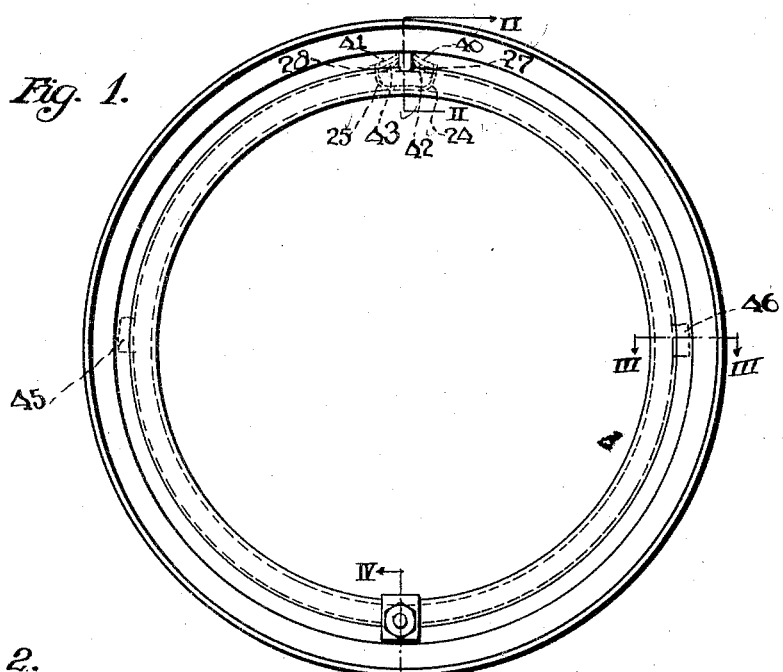
Fig. 1 is an elevational view of a wheel provided with a rim mounting constructed according to the invention.

In practicing the invention, a felloe 10 is provided having a base portion 11, and outwardly directed radial flanges 12 and 13. The flange 12 extends farther radially than the flange 13, terminating in a rim-bearing edge 14, and the flange 13 is bent inwardly, as indicated at 15, to form a bearing-surface 16 adjacent its inner edge 17.

Figure 2:
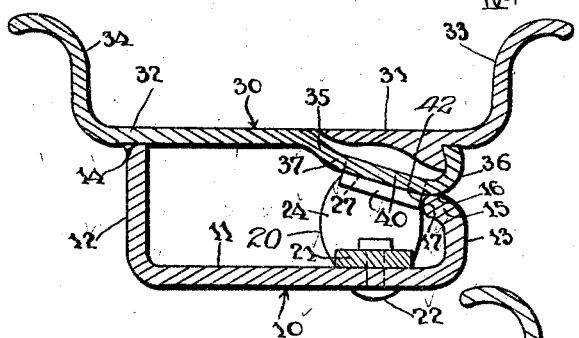
Fig. 2 is a cross-sectional view, on a larger scale, substantially along the line II—II of Fig. 1.

As shown in detail in Fig. 2, the felloe has secured thereto, at one point in its circumference, a lug 20 of substantially U shape, the base 21 of the lug being secured by rivets 22 to the base 11 of the felloe. The legs 24 and 25 of the lug terminate in inclined surfaces as indicated in dotted lines at 27, and 28, that are substantially flush with the bearing surface 16 on the felloe.

A tire rim 30 comprised of an endless member 31, and a split rim or annular member 32, is provided with conventional tire engaging flanges 33 and 34. The split rim member 32 has formed on its inner periphery, an inclined portion 35, having a shoulder 36 formed on its outer edge. An inclined surface 37 of the portion 35 rests upon the inclined edges 27 and 28 of the lug 20.

Figure 3:
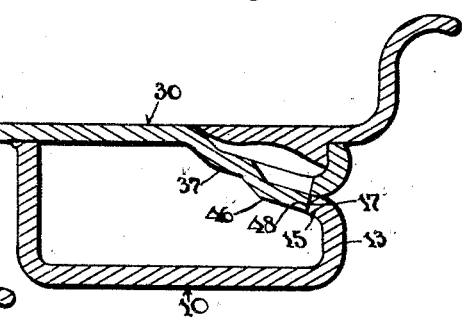
Fig. 3 is a cross-sectional view, on a larger scale, substantially along the line III—III of Fig. 1.

At one point in its circumference, the inclined portion 37 has formed thereon, radially inwardly extending lugs 40 and 41, each of the lugs being preferably formed by cutting the inclined rim portion 37, on three sides of a rectangular area, and bending the portion defined thereby radially inwardly about a laterally extending fourth side. The lugs 40 and 41 face in opposite directions, and are so relatively spaced, that they fit snugly between the legs 24 and 25 of the lug 20. The outer edges 42 and 43 of the lugs 40 and 41 abut the inner edge 17 of the felloe, normally to prevent lateral outward movement of the rim on the felloe and are spaced approximately 90 degrees in opposite directions from the legs 24 and 25 of the lug 20. Two similar lugs or projections 45 and 46 are formed on the inclined rim surface 37. The projection 46 is shown in detail in Fig. 3, and is formed similarly to the lugs 40 and 41, except that it is bent inwardly on its inner circumferentially extending side, the outer edge 48 thereof resting against the edge 17 of the felloe.

Figure 4:
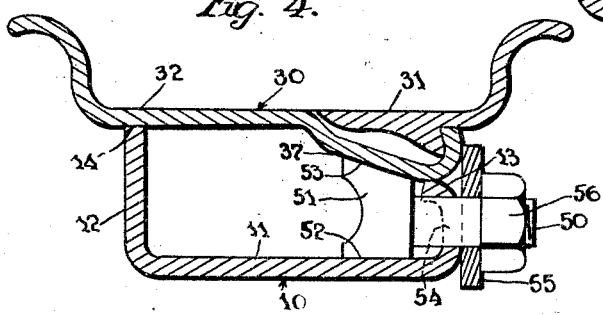
Fig. 4 is a cross-sectional view, on a larger scale, taken substantially along the line IV—IV of Fig. 1.

As best shown by Fig. 4, a securing bolt 50 is spaced substantially 180° from the lugs 40 and 41. This bolt has an integrally formed head 51 on its inner end, provided with surfaces 52 and 53, which coact with the base 11 of the felloe, and the inclined surface 37 of the rim respectively. The bolt 50 extends through an opening 54 in the flange 12, and has an its outer end a clamp or washer 55, and a nut 56, the clamp 55 abutting both the flange 13 of the felloe, and the shoulder 36 of the rim. Inward movement of the nut 56 upon the bolt 50 forces the inclined surface 53 of the head 51 against the inclined surface 37 of the rim, and firmly secures the rim in its proper position.

Disassembling of the rim elements is accomplished by removal of the nut 56, and clamp 55, then laterally displacing the lower portion of the rim, and thereafter lifting the rim vertically until the lugs 40, 41, 45, and 46 are free of the felloe. The rim is mounted upon the felloe in a manner directly the reverse of that employed in demounting the rim.

It is to be observed that in the rim mounting provided, a rim of conventional type has been employed and that the lugs on its inner periphery are formed by a cutting and punching process. It follows that all of the lugs can be bent back to their original positions, flush with the inclined rim seating face. From this arrangement it is apparent that even though the rim be constructed for the purposes of this invention it may be employed thereafter in any constructions to which a conventional rim of this type is adapted.

From the foregoing description it is apparent that a rim mounting is employed in which the fastening means is accessible from the outside of the wheel at a single point. It is also apparent, that because of the novel fastening means employed the rim is secured firmly in its proper position in alignment with the wheel.

Certain of the claims describe the lugs 45 and 46 as being substantially diametrically opposite. This language should be construed to include a variation of approximately 20° with respect to the positions of the lugs.

Although I have illustrated only the preferred form which the invention may assume and have described that form in detail, it will be apparent to those skilled in the art that it is not so limited but that various modifications and changes may be made therein without departing from the spirit of the invention or from the scope of the appended claims.

What I claim is:

1. A vehicle wheel comprising a felloe having a circumferential, inclined, supporting surface, a rim having a circumferential, inclined, seating surface adapted to rest upon the inclined surface of the felloe, said rim having projections at substantially diametrically opposite points on its inclined seat comprising stamped parts of the rim bent radially inwardly, said projections being adapted to engage behind the inclined rim-supporting surface of the felloe at the side of the surface having greatest diameter in order to prevent movement of the rim in a direction opposite that prevented by the cooperation of the inclined seat of the latter with the inclined surface of the felloe, and clamping means cooperating with the remaining circumferential length of the rim and felloe for securing the rim positively on the latter, the projections being so arranged that the rim is mounted on the felloe by tilting the former and moving the rim toward the axis of the felloe until the projections are disposed behind the edge of the inclined seat of the felloe having the greater diameter, and finally straightening the rim and wedging it on the felloe.

2. A vehicle wheel comprising a channel-shaped felloe having a circumferential, inclined, supporting surface on one leg thereof, a rim having a circumferential, inclined, seating surface adapted to rest upon the inclined surface of the felloe, said rim having projections at substantially diametrically opposite points on its inclined seating surface, the projections comprising stamped parts of the rim bent radially inwardly, said projections being adapted to engage behind the inner side of the inclined seating surface in order to prevent movement of the rim in a direction opposite that prevented by the cooperation of the inclined surfaces of the rim and felloe, and clamping means cooperating with the remaining circumferential length of the rim and felloe for securing the rim positively on the latter, the projections being so arranged that the rim is mounted on the felloe by tilting the former and moving the rim toward the axis of the felloe until the projections are disposed behind the edge of the inclined seat of the felloe having the greater diameter, and finally straightening the rim and wedging it on the felloe.

3. A vehicle wheel comprising a channel-shaped felloe having a circumferential, inclined, supporting surface on one leg thereof, a driving lug secured to the base of the felloe and having circumferentially spaced flanges projecting radially outwardly therefrom, a rim having a circumferential inclined seating surface adapted to rest upon the inclined surface of the felloe, said rim having a pair of projections on its inclined seating surface and projecting radially inwardly between the flanges of the driving connection of the felloe to provide a driving connection between the rim and the latter, said projections engaging behind the inner side of the inclined surface on the felloe to prevent movement of the rim in a direction opposite that prevented by the cooperating inclined surfaces of the rim and felloe, said rim having other projections spaced circumferentially from each side of the first-mentioned projections at substantially diametrically opposite points and comprising stamped parts of the rim bent radially inwardly for engagement behind the last-mentioned leg of the felloe similarly to that of the first-mentioned projections, and clamping means cooperating with the remaining length of the rim and felloe for securing the rim positively on the latter, the projections being so arranged that the rim is mounted on the felloe by tilting the former and moving the rim toward the axis of the felloe until the projections are disposed at the side of the edge of the inclined seat of the felloe having the greater diameter, and finally straightening the rim and wedging it on the felloe.

In witness whereof, I have hereunto signed my name.

Signed at Akron, in the county of Summit, and State of Ohio, this 19th day of December, 1927.

WILL T. WHITE.